United States Patent [19]
Emery

[11] 3,755,965
[45] Sept. 4, 1973

[54] PLANT CISTERN

[76] Inventor: Dan D. Emery, 5514 State St., Boise, Idaho 83703

[22] Filed: Dec. 20, 1971

[21] Appl. No.: 209,663

[52] U.S. Cl............................ 47/27, 71/64 A, 47/30
[51] Int. Cl............................................. A01g 13/10
[58] Field of Search .................... 47/25, 27, 30, 32, 47/48.5; 71/64

[56] References Cited
UNITED STATES PATENTS

| | | | |
|---|---|---|---|
| 1,029,107 | 6/1912 | Couls | 47/48.5 X |
| 2,375,860 | 5/1945 | Markham | 47/48.5 |
| 3,005,287 | 10/1961 | Dudley | 47/25 |
| 3,060,012 | 10/1962 | Pavek | 71/64 |
| 3,287,851 | 11/1966 | Cramer | 47/25 |

Primary Examiner—Robert E. Bagwill
Attorney—John W. Kraft

[57] ABSTRACT

The plant cistern of this invention comprises a cover portion and a cistern portion. The cover portion includes an inclined dish issuing downwardly at an angle to an upstanding shield portion in the centermost portion of the dish. Adjacent the upstanding shield portion are a multiplicity of entranceways through the dish. The cistern portion includes a bowl having a downwardly projecting tube-like protector portion at the centermost portion thereof and a cake fabricated from a soil admixture, such as compound peat moss and plant nutrients, disposed in the bowl. The cake generally conforms to the bowl, and is provided with sloping wall adjacent the uppermost terminal edge of the bowl, the wall issuing downwardly at an angle to an entranceway through the centermost portion of the cake.

3 Claims, 3 Drawing Figures

PATENTED SEP 4 1973  3,755,965

DAN D. EMERY  INVENTOR.

BY

PLANT CISTERN

FIELD OF INVENTION

This invention relates to plant containers for seeds and plant seedlings to be planted in the earth, and more particularly to a plant cistern including plant nutrients and being operable to collect and hold water.

DESCRIPTION OF THE PRIOR ART

In the prior art, plant seedlings have been planted in an admixture of soils and plant nutrients, placed in containers fabricated from compressed peat moss, papier-mache, water soluble plastics, and the like, and planted in the earth. It is commonly known that the survival rate of plant seedlings is much greater if planted in this manner since a plant seedling, having derived substantial plant nutrients during the formative stages of growth, tends to be stronger to withstand disease, weather conditions, and infestation. Additionally, containers tend to prevent ground rodents, such as moles, and larvae from attacking the plant roots during the formative period of growth. Since soil admixtures are of a limited area, moisture tends to be quickly evaporated therefrom and to be conducted out of the admixtures to the more arid surrounding soil.

Accordingly, it is an extremely important object of the present invention to provide means in a planting container operable to collect water and to retard evaporation therefrom.

Another object of this invention is to provide a protective shield for a plant seedling from animal attack.

A further object is to provide in a planting container a protector portion under the surface of the earth and about the roots of a seedling tending to prevent ground rodents, such as moles, and larvae in the soil from attacking the roots of a plant seedling.

Another object of the invention is to provide insulating means in a planting container to insulate a plant seedling from changes in ambient temperature. These and other objects shall become apparent from the description following, it being understood that modifications may be made without affecting the teachings of the invention here set out.

SUMMARY OF THE INVENTION

Generally, the plant cistern of this invention comprises a cover portion and a cistern portion. The cover portion includes an inclined dish issuing downwardly at an angle to an upstanding shield portion in the centermost portion of the dish. Adjacent the upstanding shield portion are a multiplicity of entranceways through the dish. The cistern portion includes a bowl having a downwardly projecting tube-like protector portion at the centermost portion thereof and a cake fabricated from a soil admixture, such as compound peat moss and plant nutrients, disposed in the bowl. The cake generally conforms to the bowl, and is provided with a sloping wall adjacent the uppermost terminal edge of the bowl, the wall issuing downwardly at an angle to an entranceway through the centermost portion of the cake.

A more thorough and comprehensive understanding may be had from the detailed description of the preferred embodiment when read in connection with the drawings forming a part of this specification.

Figure 1:
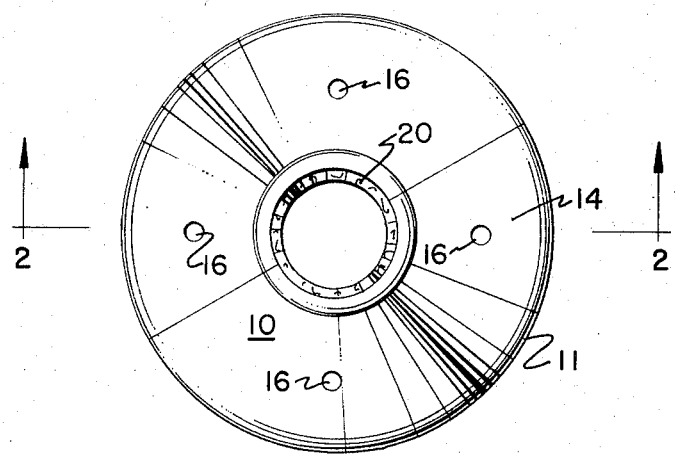
FIG. 1 is a top plan view of the plant cistern of this invention showing to advantage the cover and a portion of the cake.
Figure 2:
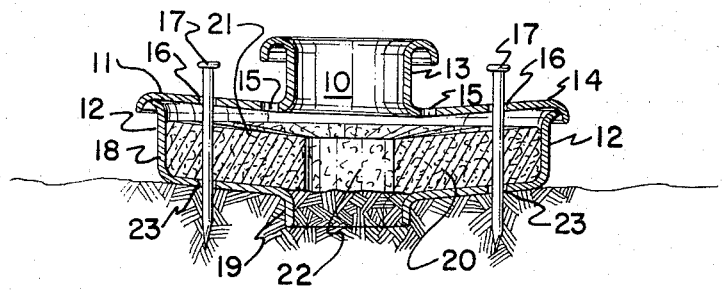
FIG. 2 is a cross-sectional side elevational view of the invention taken substantially along the lines 2—2 of the FIG. 1 showing to advantage the cover, including an upstanding tubular shield, the cistern including a downwardly projecting protector portion and a cake portion, the plant cistern being juxtapositioned on an earth planting bed for illustrative purposes.

DETAILED DESCRIPTION OF THE PREFERRED EMBODIMENT:

Referring now to the drawings, and more paritcularly to the FIG. 1, the plant cistern of the present invention is shown to advantage and generally designated by the numeral 10. The plant cistern 10 includes a dish-like collector cover 11 and a plant protecting cistern 12, shown to advantage in the FIG. 2.

Figure 3:
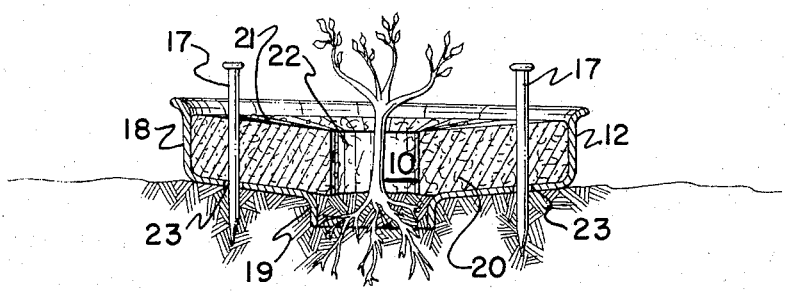
FIG. 3 is a cross-sectional side elevational view of the invention with the cover removed and with a plant seedling disposed therein for illustrative purposes.

The collector cover 11 includes an annular upstanding tube-like shield 13 disposed at the center of the cover 11. An inclined dish portion 14, issuing at an angle upwardly from the lowermost center portion adjacent the terminal end of the shield 13, is provided. Adjacent the shield 13 are disposed a multiplicity of entranceways 15. Water falling on the dish portion 14 tends to collect therein and flows by gravity through the entranceways 15 into the cistern 12. It has been found convenient to fabricate the collector cover in two halves, as shown to advantage in the FIG. 1, particularly when planting sprouted seedlings, as hereinafter later described. A multiplicity of holes 16 are distally disposed from the terminal edge in the dish portion 14. Stakes 17, advantageously shown in the FIGS. 2 and 3, may be driven through the holes 16 in order to secure the plant cistern 10 to the earth, as hereinafter described.

The cistern 12 comprises a bowl 18 having a tubular depending root protector portion 19 disposed at the center lowermost portion thereof, and a fertilizer cake portion 20. The cake portion 20 is provided with an inclined surface portion 21 issuing at an angle upwardly from an annular tube-like entranceway 22, provided in the cake portion 20, toward the uppermost terminal edge of the bowl 18. The bowl 18 may also be provided with holes 23 through which the stakes 17 may be driven.

It is to be understood that the cover 11 and the bowl 18 of the cistern 12 may be fabricated from any of a variety of materials. In practice, it has been found to advantage to fabricate these elements from decomposable materials, such as papier-mache, peat moss, sludge material, and the like, since such materials tend to decompose and form a protective cone about a growing plant. In some cases, it has been found to advantage to coat the exterior surfaces of the cover 11 and the bowl 18 of the cistern 12 with vegetable oil, so as to retard the decomposition of these elements, since vegetable oil breaks down less readily than do the decomposable materials and, at the same time, does not tend to have injurious affect on most plants.

The cake portion 20 is preferably an admixture of soils and a combination of densely-packed peat moss and sewage sludge, or similar plant nutrient material.

In operation a seed or plant seedling is planted in the earth as commonly done. The cistern 12, including the bowl 18 and the cake portion 20, is juxtapositioned over and around the seed or plant seedling so that the same is disposed within the protector portion 19. In practice, the bowl 18 with the protector portion 19 is pressed mannually into the loose soil around the seed or plant seedling. The protector portion 19 tends to keep earth rodents, such as moles, from finding and eating the tender roots of the plant until the plant has matured to a point in its growth that the plant is more likely to survive rodent attack. After the cistern 12 has been juxtapositioned to over the seed or plant seedling, the cover 11 is placed on the cistern 12, and the stakes 17 are driven through the holes 16, the cake portion 20, and the bowl portion 18 to secure the plant cistern 10 of this invention to the earth. The upstanding shield 13 of the cover 11 provides a shield which tends to protect a young plant from attack of such animals, as rabbits, squirrels, field mice, and the like, until the plant has more fully matured to a point of growth above the cistern 10. Water from any source, such as natural rainfall, irrigation, sprinkler systems, or poured from a bucket, tends to be collected by the dish portion 14. Water collected in the dish portion 14 tends to flow by gravity through the entranceways 15 onto the cake portion 20, a portion of which may flow through the entranceway 22 to the earth covering the seed or plant seedling. The cake portion 20 tends to become saturated and to remain moist since the more impervious cover 14 tends to prevent evaporation. Moisture from the cake portion 20 tends to be conducted to the soil surrounding the plant, carrying with it nutrients from the cake portion 20. Such environment has been found very conducive to plant growth. It should be additionally observed that the cistern 10 tends to insulate the seed or plant seedlings from ambient temperature changes, including frost. As a plant grows, the cistern 10 tends to decompose about the plant, and, in so doing, tends to cause the plant to grow a stronger root system, while tending to continue to nourish the plant.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A plant cistern comprising a cistern portion having an upstanding sidewall, a bottom wall integral therewith, said bottom wall being downwardly inclined from said sidewall and terminating in a vertically depending flange forming an opening in said bottom wall for plant growth therethrough, a body of compacted plant nutrient material in said cistern portion having an aperture vertically coaxial with said bottom wall opening, a cover portion resting on said cistern portion and generally covering the same, said cover portion being downwardly inclined from the periphery thereof to an upstanding tube-like shield defining an opening in said cover portion generally centrally thereof and through which said plant growth may extend, said cover portion having entranceways therethrough adapted to admit water into said cistern portion.

2. A plant cistern as in claim 1, wherein said entranceways are adjacent the lower end of said shield.

3. A plant cistern as in claim 1, wherein said cistern and cover portions are molded of a material selected from the group consisting of paper-mache, peat moss and sludge, and said nutrient material is comprised of a mixture of soil, peat moss and sewage sludge.

* * * * *